United States Patent [19]

Shuff

[11] Patent Number: 5,197,549

[45] Date of Patent: Mar. 30, 1993

[54] ONION TOPPER

[75] Inventor: David Shuff, Parma, Id.

[73] Assignee: Specialized Parts & Manufacturing Co., Parma, Id.

[21] Appl. No.: 789,255

[22] Filed: Nov. 7, 1991

[51] Int. Cl.[5] .................... A01D 23/04; A01D 33/02
[52] U.S. Cl. .................................. 171/17; 56/12.8; 56/327.1; 171/41
[58] Field of Search ................ 171/17, 31, 40, 41, 171/42; 56/327.1, 12.8, 121.42, 121.44

[56] References Cited

U.S. PATENT DOCUMENTS

| 2,553,519 | 5/1951 | Lenz | 171/17 |
| 2,750,977 | 6/1956 | Vella et al. | 171/17 |
| 3,285,306 | 11/1966 | Wetzel | 171/17 |
| 5,024,278 | 6/1991 | Shuknecht | 171/17 |

OTHER PUBLICATIONS

L. G. Williams and N. F. Franklin, *Harvesting, Handling and Storing Yellow Sweet Spanish Onions*, University of Idaho, College of Agriculture, Bulletin #526 (May 1971).

*Primary Examiner*—David J. Bagnell
*Attorney, Agent, or Firm*—Frank J. Dykas; Craig M. Korfanta; Ken J. Pedersen

[57] ABSTRACT

The invention is a field onion topping machine with a front-end gathering and lifting assembly 16 which delivers onions to a transport assembly 25 and a substantially horizontal cutting table 26 provided by a moving chain conveyor 15. A fan 17, spaced apart from beneath the cutting table 26 but being connected to beneath the cutting table 26 by suitable ductwork 18, blows a stream of air up through conveyor chain 15 in the area of the cutting table 26, lifting and extending the tops, but not the bulbs of the onions on the chain, into cutter member 27 where the tops are removed and blown out discharge chute 19 by the same stream of air. Onions with their tops removed exit at the back of the machine via discharge assembly 20.

4 Claims, 7 Drawing Sheets

ONION TOPPER

BACKGROUND OF THE INVENTION

1. Technical Field

This invention relates to field harvesting machines for onions, and especially to machines for removing onion tops.

2. Background Art

Some of the difficulties in bulk harvesting of onions include:

1. Maneuverability of the harvester machinery in the onion field;
2. Adaptability of the machinery to green, or wet, tops, and to onions of varying sizes;
3. Capacity of the machinery, and
4. Ability of the machinery to prevent damage to the onions.

The University of Idaho, College of Agriculture, Bulletin 526 (May, 1971) discloses 9 approaches to onion harvester design, including an Air-Flo Harvester (Table, p. 4).

U.S. Pat. No. 2,553,519 (Lenz) discloses an onion topper in which an air stream lifts the onion tops on a horizontal portion of an open flight conveyor where a reciprocating sickle blade cuts the lifted onion tops. In this reference, the fan 62 is shown in the drawings to be directly underneath the horizontal portion of the conveyor, and is recited in both claims to be vertically axised and mounted between the spaced portions of the conveyor runs. At column 5, lines 17-20, however, this reference states that it is not essential for the fan to be mounted close to the top run of the conveyor.

My experience with the onion topper design disclosed in U.S. Pat. No. 2,553,519 is that debris in the form of stones, sticks and clods of dirt fall through the conveyor and onto the rotating blades of the fan, damaging the blades. Also, the air stream at the horizontal portion of the conveyor immediately above the fan is not uniform, resulting in uneven cutting of onion tops.

Therefore, there is still a need in the onion harvesting field for an air stream machine which is not susceptible to fan blade damage from debris, and which is able to uniformly cut onion tops.

DISCLOSURE OF INVENTION

What I have discovered is by spacing apart the fan in the air stream machine from beneath the cutting table, and connecting the fan to beneath said cutting table by suitable ductwork, the problem of debris falling through the conveyor and onto the rotating fan blades may be eliminated. Also, by placing a distribution foil in the ductwork beneath the cutting table, the problem of non-uniform air stream above the fan may also be eliminated.

Furthermore, by orienting the fan to be horizontally axised, the machine may be made more compact and maneuverable, and the fan blades more protected from debris.

Furthermore, by supplying a plurality of fans, the machine may be made with more adaptabiity to varying onion sizes and conditions, and with more capacity.

Furthermore, by providing also a substantially horizontal reciprocating cutter member driven at or near its midpoint by a connecting bar to a revolving cam configured to balance the weight of the cutter member and connecting bar, the problem of uneven cutting of onion tops may be eliminated.

BEST MODE FOR CARRYING OUT INVENTION

Figure 1:
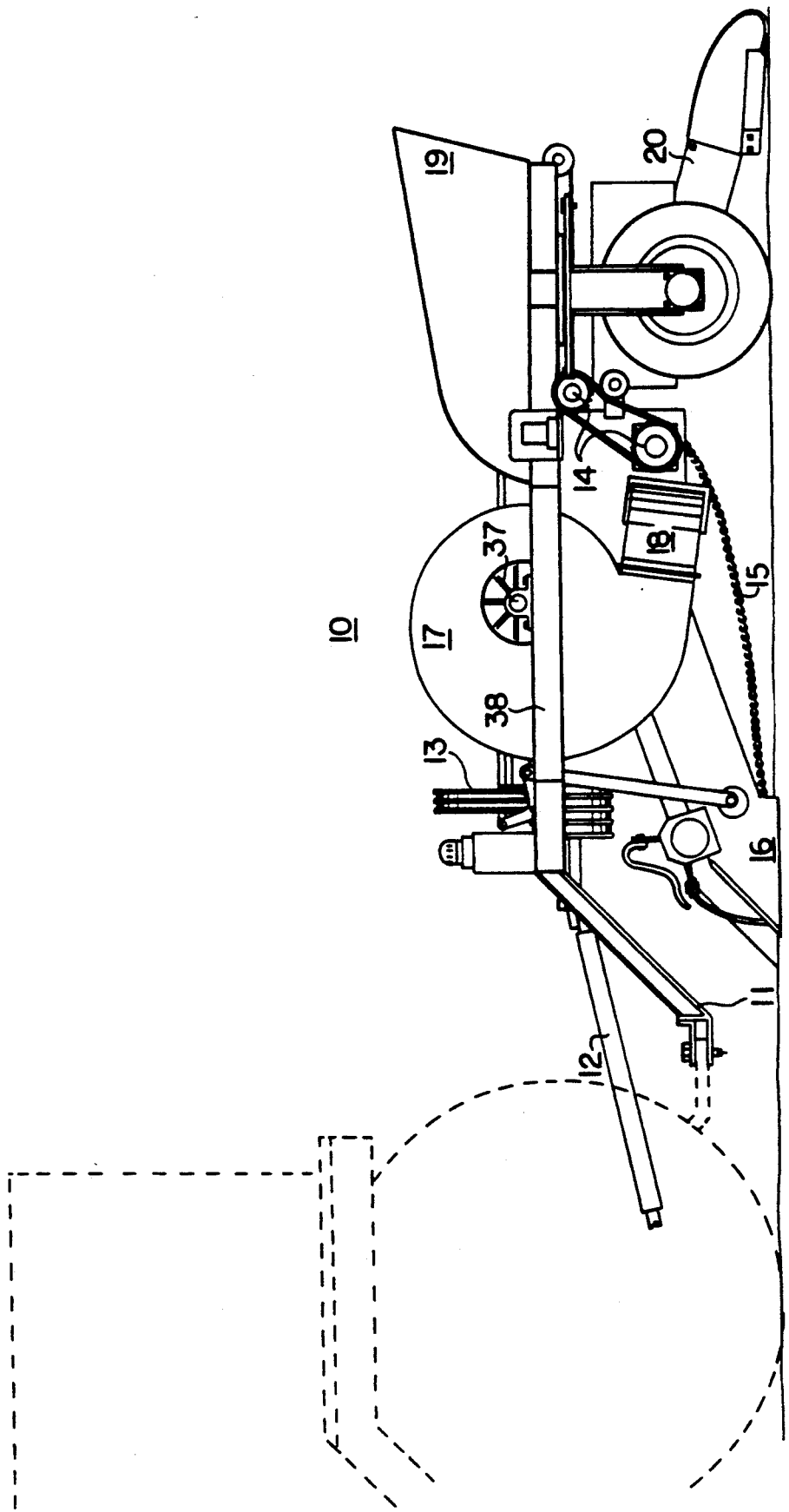
FIG. 1 is a side view of my machine attached to a field tractor.

Referring to FIG. 1, there is depicted generally my onion topper machine 10 attached to a field tractor by tongue 11 and power take-off shaft 12. Shaft 12 is connected to a series of pulleys and belts 13 which in turn are connected to a set of drive gears 14 to move conveyor chain 15 and operate front-end gathering and lifting assembly 16. Pulleys and belts 13 are also connected to fan 17 to blow air into ductwork 18. Fan axis 37 is above machine frame member 38. Ductwork 18 extends first down from fan 17 and then passes up to beneath discharge chute 19. Discharge chute 19 provides an exit for cut onion tops blown out from the cutting table and assembly (not shown in this Figure). Discharge assembly 20 provides an exit for onions with their tops removed, either to be laid in windrows behind the machine for field drying, or to be picked up by an onion loader for transport from the field.

Figure 2:
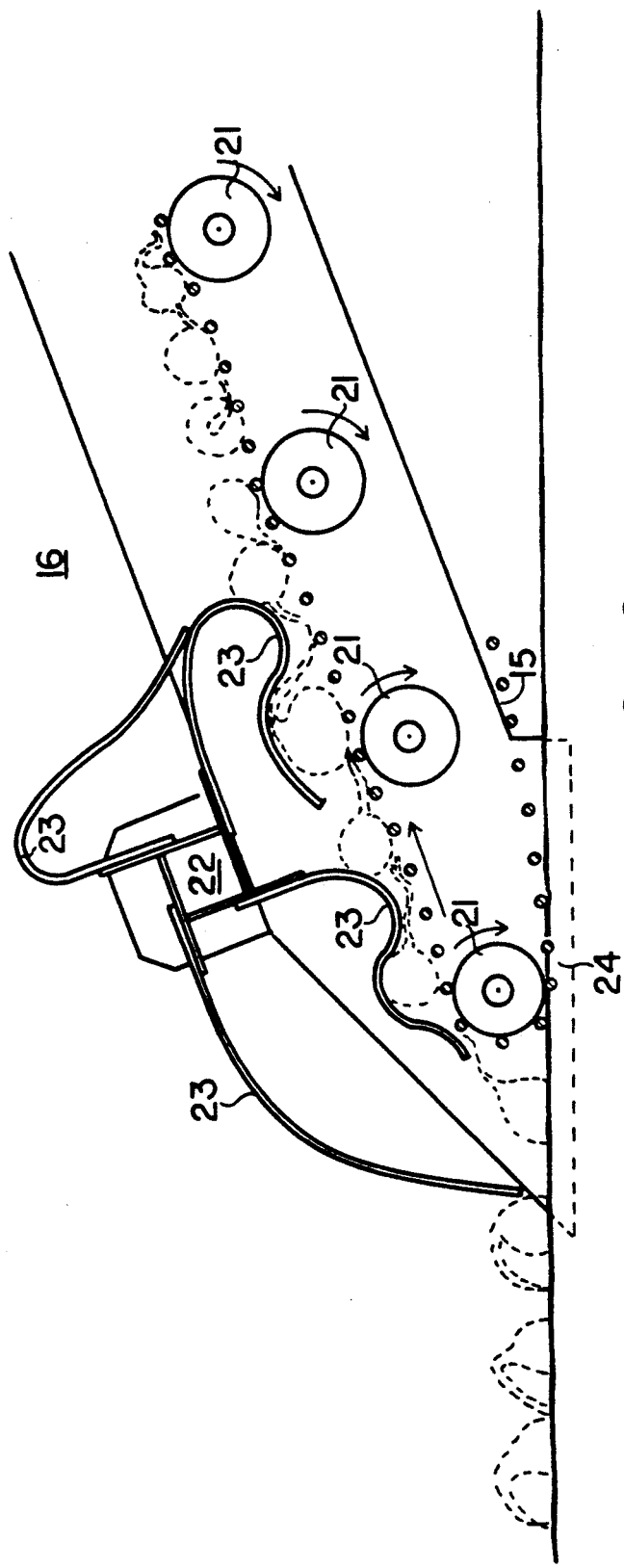
FIG. 2 is a partial side view, partially in cross-section, of the front-end gathering and lifting assembly of my machine.

Referring to FIG. 2, there is depicted generally front end gathering and lifting assembly 16 which is driven by conveyor chain 15 suspended on rollers 21 and moving in the direction shown by the arrows. Flapper unit 22 with flapper pads 23 is driven by a gear and chain assembly (not shown) from the hub of one of the rollers 21. Flapper unit 22 gently coaxes the onions up off the ground and onto conveyor chain 15. Side blade 24, which may be adjusted to be on the surface of or in the ground, also helps to gently coax the onions up off the ground and onto conveyor chain 15.

Figure 3:
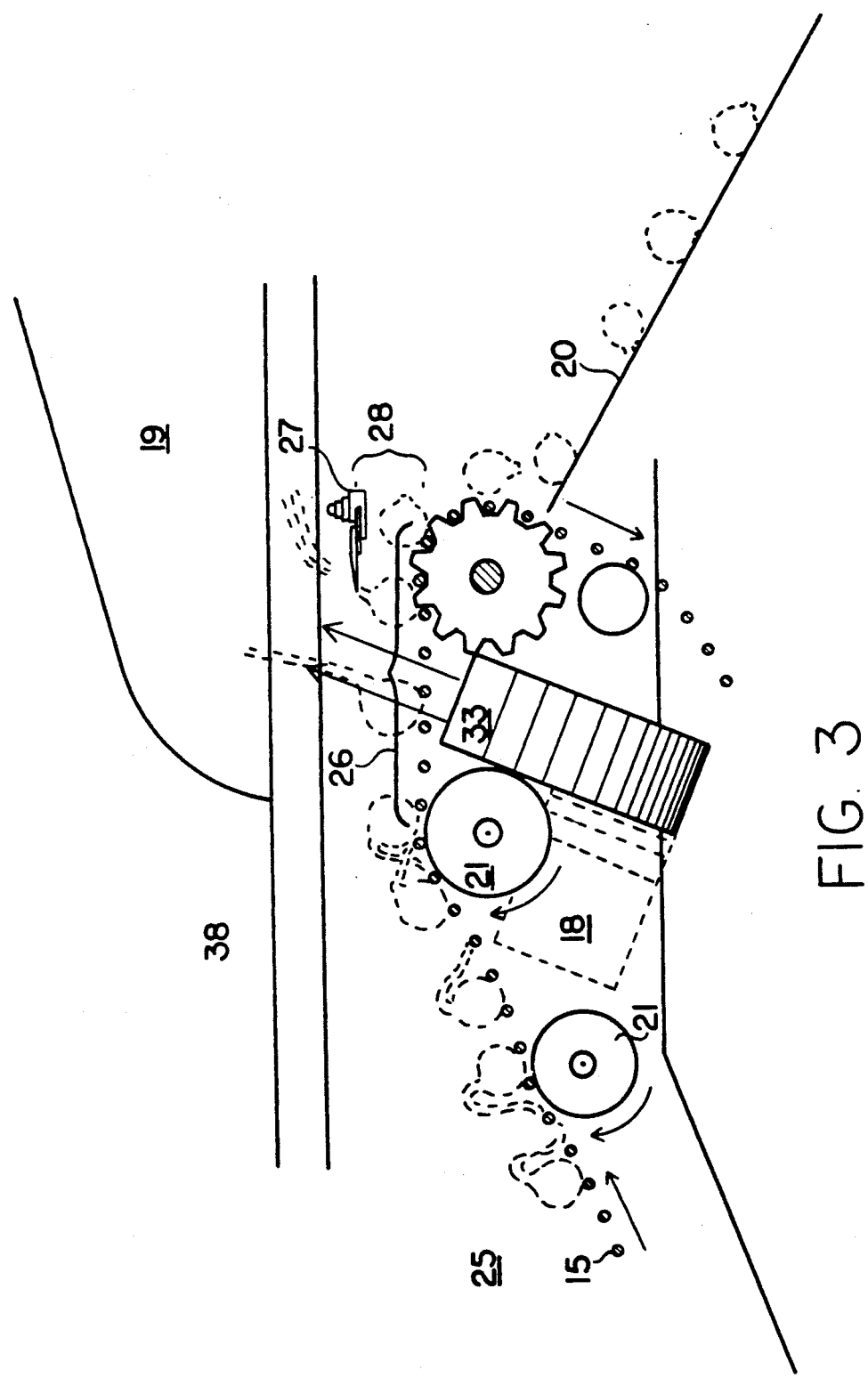
FIG. 3 is a partial side view, partially in cross-section, of the onion transport assembly, substantially horizontal cutting table, cutting member, ductwork and distributor foil of my machine.

Referring to FIG. 3, there is depicted generally transport assembly 25 for moving the onions upwardly and backwardly in the machine on moving conveyor chain 15. Also depicted generally is substantially horizontal cutting table 26 provided by a level section of the moving conveyor chain 15. Cutting table 26 is below machine frame member 38. Sickle cutter member 27 is spaced apart an adjustable distance 28 above cutting table 26. Ductwork 18 extends first down from fan 17 and then passes up as distributor foil 33 to beneath cutting table 26. A stream of air from ductwork 18 blows up through conveyor chain 15 as shown by the arrows in the area of the cutting table. The stream of air lifts the lighter onion tops, but not the heavier bulbs, and extends the tops into the cutter member 27 where they are cut off and removed by being blown out by the same stream of air through discharge chute 19. Onions with their tops removed roll onto discharge assembly 20, which may be a series of chutes and conveyors, and exit at the back of the machine.

Figure 4:
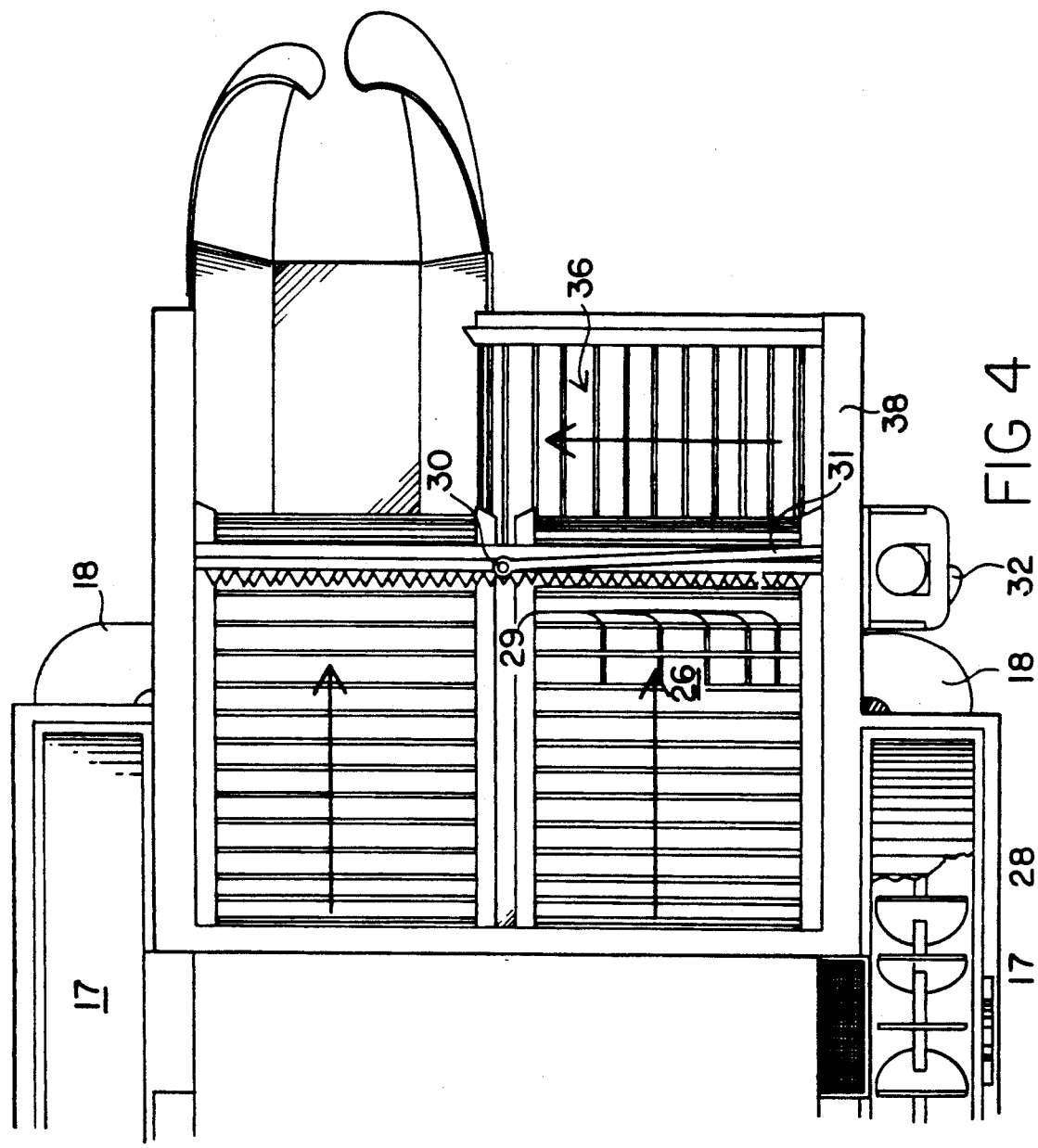
FIG. 4 is a top view, partially in cross-section, of the fans, ductwork, cutting member and onion discharge assembly of my invention.

Referring to FIG. 4, there is depicted two horizontally-axised fans 17 and two sets of ductwork 18 connecting the outlet of the fans to beneath the cutting table 26. A representative fan blade 28 is shown in the partially cross-sectioned portion of the fan. Ductwork 18 terminates in a relatively flat opening beneath the cutting table 26. Near the opening of the ductwork are provided outlet vanes 29 which make a distributor foil. These vanes are provided at logarithmic intervals transversely across the width of the opening so that, when the pressure drop in the distributor is taken into account, the air stream velocity across the distributor opening is uniform. Also shown is cutter member 27 driven at or near its midpoint 30 by a connecting bar 31 to a revolving cam 32. The cam 32 is also driven by the series of pulleys and belts 13. Also shown is roller conveyor 36 which receives the onions with their tops removed from the left-hand side cutting table 26, and directs them to the area of the exit from the right-hand side cutting table 26 where they are mixed together and exit at the back of the machine from discharge assembly 20.

Figure 5:
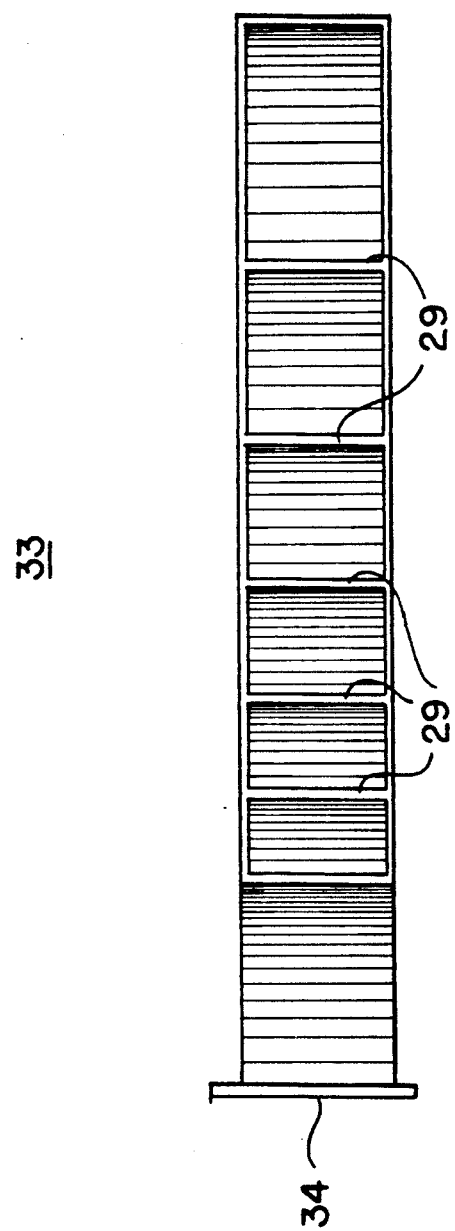
FIG. 5 is a top view of the distributor foil of my invention.

Referring to FIG. 5, there is depicted from top view generally distributor foil 33 with inlet opening 34 for connecting to the fan 17 outlet and outlet vanes 29.

Figure 6:
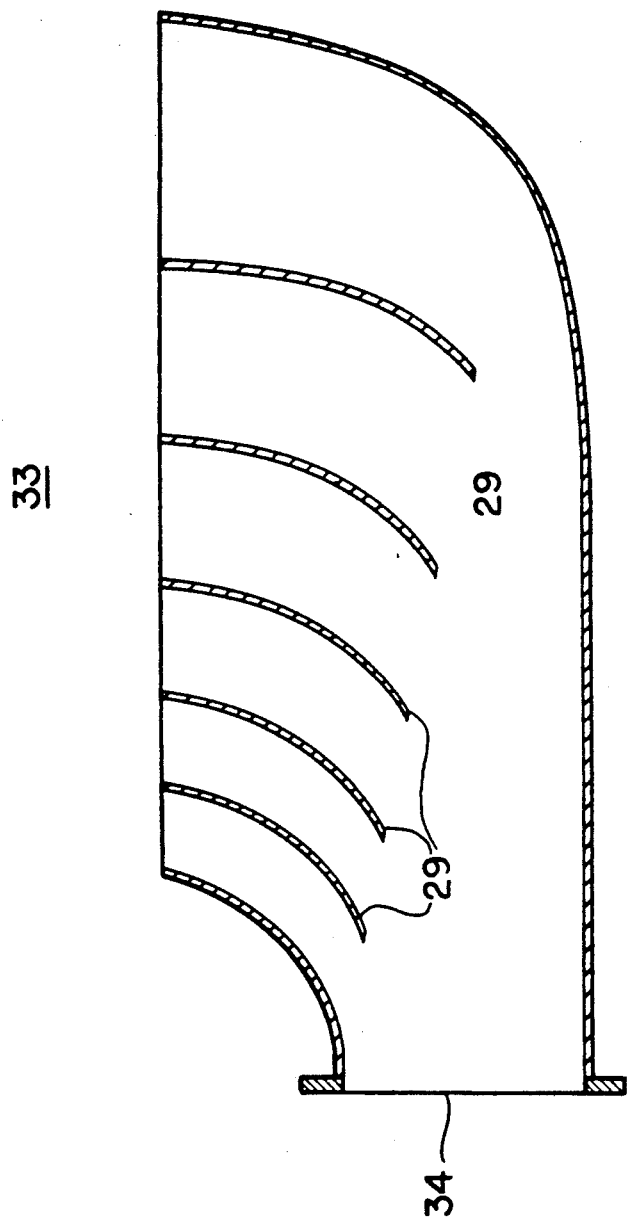
FIG. 6 is a side, cross-sectional view of the distributor foil, of FIG. 5.

Referring to FIG. 6, there is depicted from side, cross-sectional view the distributor foil 33 from FIG. 5.

Figure 7:
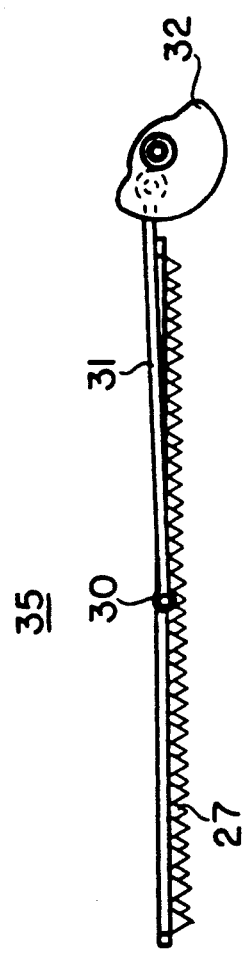
FIG. 7 is a top view of my balanced cutter assembly.

Referring to FIG. 7, there is depicted from top view generally cutting assembly 35 with cutter member 27 driven at or near its midpoint 30 by connecting bar 31 to revolving cam 32. The generally cylindrical cam 32 is configured by providing an eccentric weight equal in moment about the cam's axis to the weight-moment of the sickle cutter member 27 and connecting bar 31. This way the cam 32 will rotate smoothly throughout each revolution, regardless whether connecting bar 31 is partially or fully extended, providing a smooth, reciprocating cutting action for cutter member 27, and more even cutting of onion tops.

While there is shown and described the present preferred embodiment of the invention, it is to be distinctly understood that this invention is not limited thereto but may be variously embodied to practice within the scope of the following claims.

I claim:

1. In an onion harvesting and topping machine comprising:
    a front-end onion gathering and lifting assembly;
    an onion transport assembly connected to said gathering and lifting assembly for moving the onions upwardly and backwardly within said topping machine;
    a substantially horizontal cutting table connected to said transport assembly for receiving the onions, said cutting table being pervious to air;
    a fan for blowing air under positive pressure upwardly through said cutting table, said fan being spaced apart from beneath said cutting table and being connected to beneath said cutting table by suitable ductwork;
    a cutting assembly for receiving onion tops of onions on said cutting table, said cutting assembly being spaced apart above said cutting table;
    a discharge chute for receiving cut onion tops from said cutting assembly; and
    a discharge assembly connected to said cutting table for receiving onions with their tops removed,
    the improvement which comprises the fan being positioned on the machine so that the ductwork connecting the outlet of the fan to beneath the cutting table extends first down from the fan and then passes up to beneath the cutting table.

2. The machine of claim 1 which comprises two fans, the ductwork connecting the outlets of both fans to beneath the cutting table extending first down from both fans and then passing up to beneath the cutting table.

3. The machine of claim 1 wherein the axis of the fan is above the cutting table.

4. The machine of claim 1 wherein said ductwork comprises a distributor foil near its terminal opening made of a plurality of outlet vanes provided at logarithmic intervals transversely across the width of the opening so that, when the pressure drop in the distributor foil is taken into account, the air stream velocity across the terminal opening is uniform.

* * * * *